(12) United States Patent
Takano

(10) Patent No.: US 7,019,897 B2
(45) Date of Patent: Mar. 28, 2006

(54) REAR PROJECTION TYPE PROJECTOR DEVICE

(75) Inventor: Hirokuni Takano, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/814,267

(22) Filed: Apr. 1, 2004

(65) Prior Publication Data

US 2004/0201887 A1   Oct. 14, 2004

(30) Foreign Application Priority Data

Apr. 8, 2003  (JP)  ............................. 2003-103777
Mar. 22, 2004  (JP)  ............................. 2004-083440

(51) Int. Cl.
  *G03B 21/56* (2006.01)
  *G03B 21/22* (2006.01)
(52) U.S. Cl. ..................... 359/443; 359/460; 353/77
(58) Field of Classification Search ................ 359/443, 359/460; 353/77, 78, 79, 100; 348/836
  See application file for complete search history.

(56) References Cited

U.S. PATENT DOCUMENTS

| 3,848,980 | A | * | 11/1974 | Plummer ...................... 353/77 |
| 4,139,283 | A | * | 2/1979 | Cook .......................... 359/460 |
| 5,402,263 | A | * | 3/1995 | Kita et al. ................... 359/443 |
| 5,745,288 | A | * | 4/1998 | Miyata et al. ............... 359/457 |
| 5,949,576 | A | * | 9/1999 | Wilson ........................ 359/443 |
| 6,347,012 | B1 | * | 2/2002 | Monson et al. ............. 359/460 |

FOREIGN PATENT DOCUMENTS

JP            7-209753        8/1995

* cited by examiner

*Primary Examiner*—Christopher Mahoney
(74) *Attorney, Agent, or Firm*—Fitzpatrick, Cella, Harper & Scinto

(57) ABSTRACT

In a rear projection type projector device, a transparent plate-like member is supported so as to incline from a vertical surface, and a lenticular screen and a Fresnel lens are placed on the transparent plate-like member. Accordingly, the lenticular lens and the Fresnel lens are in tight contact with the front plate owing to their own weight, and this makes it unlikely to create spaces between these components.

6 Claims, 8 Drawing Sheets

REAR PROJECTION TYPE PROJECTOR DEVICE

BACKGROUND OF THE INVENTION

1. Field of the Invention

The present invention relates to a rear projection type projector device that allows a light image projected from a rear side of a screen member to be viewed from a front side of the screen member.

2. Related Background Art

In recent years, a rear projection type projector device has been proposed which allows a light image projected from a rear side of a screen member to be viewed from a front side of the screen member.

FIG. 5 is a sectional view showing an example of the structure of a rear projection type projector device.

Reference numeral 1 denotes a video source (light image output means) and reference numeral 2 denotes a reflection mirror (reflecting means). Reference numeral 3 denotes a lenticular screen (screen member), and reference numeral 4 denotes a front plate (transparent member). Reference numeral 5 denotes a Fresnel lens, and reference numeral 6 is a housing. Reference numeral 7 denotes a picture frame-like escutcheon, and reference numerals 8 and 9 denote members for locating at least the screen member 3 at an opening in the housing 6.

A device D3 comprises the video source (light image output means) 1 that outputs a light image, the reflection mirror (reflecting means) that reflects the light image from the video source 1, and the lenticular screen (screen member) on which the light image is reflected by the reflection mirror 2. Thus, the light image projected on the lenticular screen 3 from the rear side (as shown by arrow R) can be viewed from the front side (as shown by arrow F). Reference numeral 4 denotes the transparent member (hereinafter referred to as the "front plate") located in front F of the lenticular screen 3. Reference numeral 5 denotes the Fresnel lens.

In spite of its large screen, such a rear projection type projector device requires a smaller depth and a smaller installation area than CRT display devices. Screen device is disclosed, for example, Japanese Patent Application Laid-Open No. H07-209753.

The above described front plate 4 is composed of a relatively rigid member. However, the lenticular screen 3 and the Fresnel lens 5 are only 1 to 2 mm in thickness and are thus not substantially rigid. Furthermore, the lenticular screen 3 and the Fresnel lens 5 are conventionally held vertically with only their ends supported on the housing 6 (see the members denoted by reference numerals 8 and 9). Thus, the lenticular screen 3 or the Fresnel lens 5 may be buckled by its own weight to create spaces S between the front plate 4 and the lenticular screen 3 and the Fresnel lens 5. Consequently, resolution may decrease or the image may be distorted, thus disadvantageously degrading image quality.

SUMMARY OF THE INVENTION

It is thus an object of the present invention to provide a rear projection type projector device that prevents a decrease in resolution and the distortion of an image, thus preventing the degradation of image quality.

Accordingly, the present invention is provided in view of the above circumstances. There is provided a rear projection type projector device comprising light image output means for outputting a light image, reflecting means for reflecting the light image from the light image output means, and a screen member on which the light image reflected by the reflecting means is projected, the device allowing the light image projected from a rear side of the screen member to be viewed from a front side of the screen member, the device further comprising:

a transparent member located so as to incline from a vertical plane, wherein the screen member is located so as to be placed on the transparent member.

DESCRIPTION OF THE PREFERRED EMBODIMENTS

Figure 1:
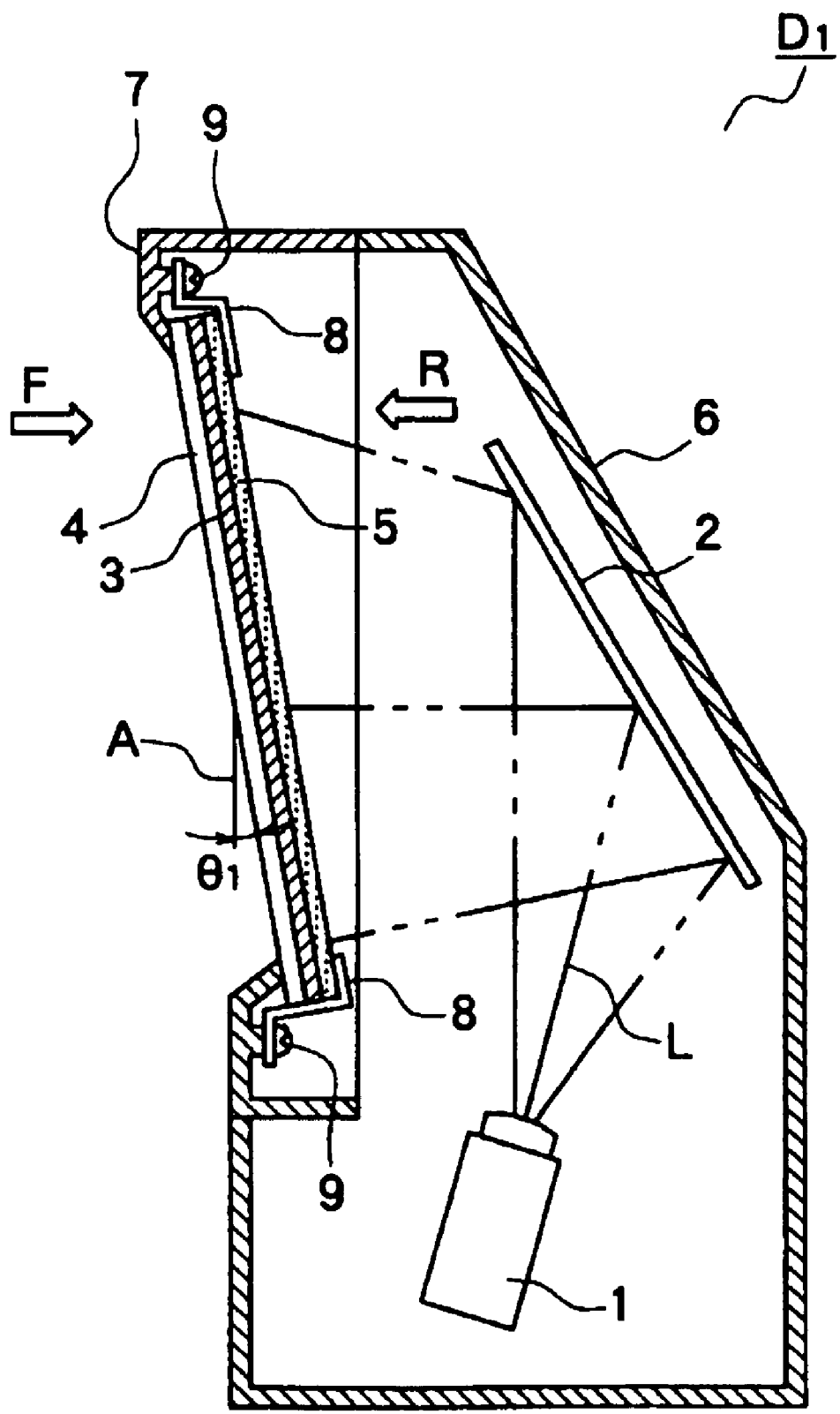
FIG. 1 is a sectional view showing an example of the structure of a rear projection type projector device according to the present invention.

An embodiment of the present invention will be described below with reference to FIGS. 1 to 4. In the Figures, the same reference numerals denote the same components.

Figure 2:
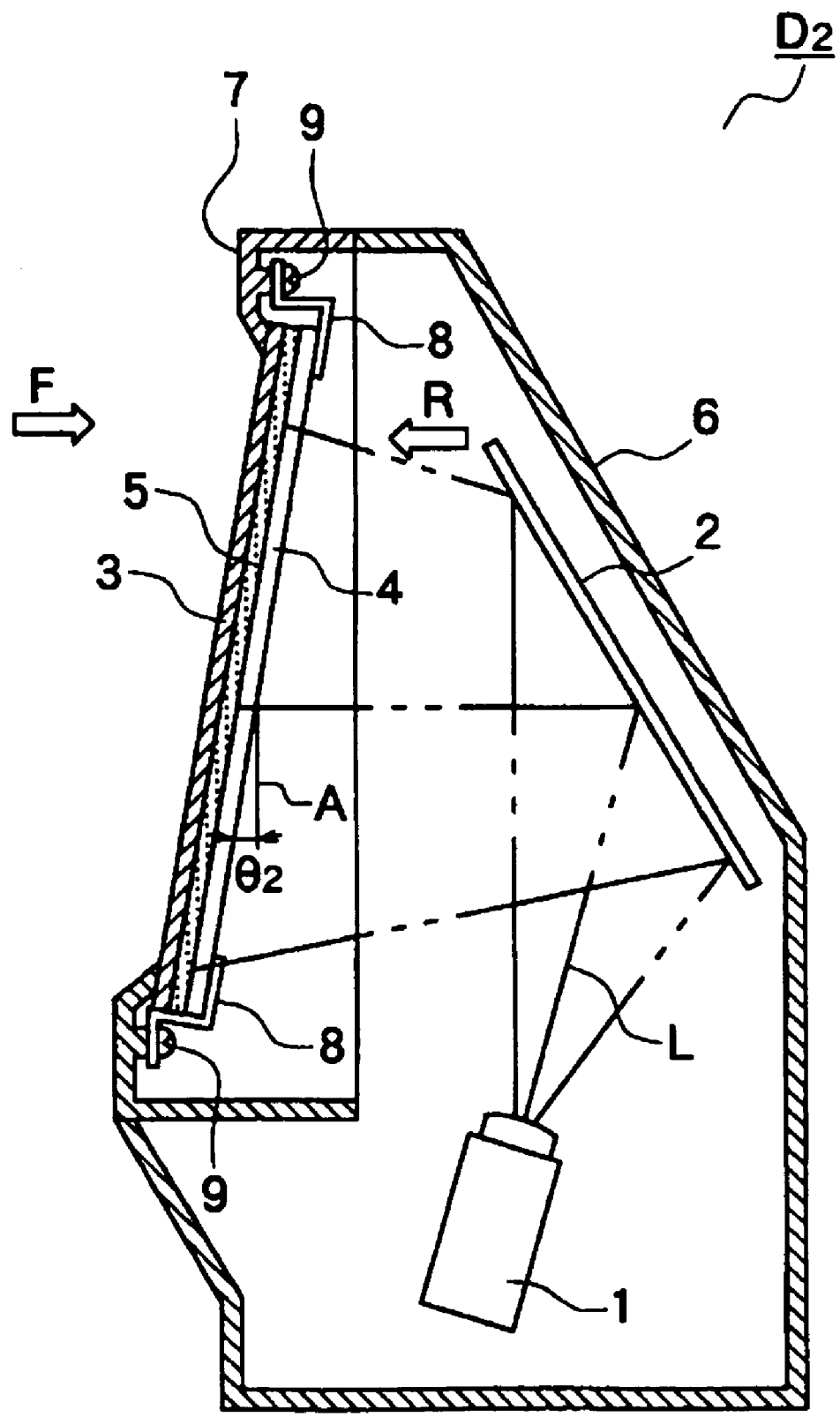
FIG. 2 is a sectional view showing another example of the structure of a rear projection type projector device according to the present invention.
Figure 3:
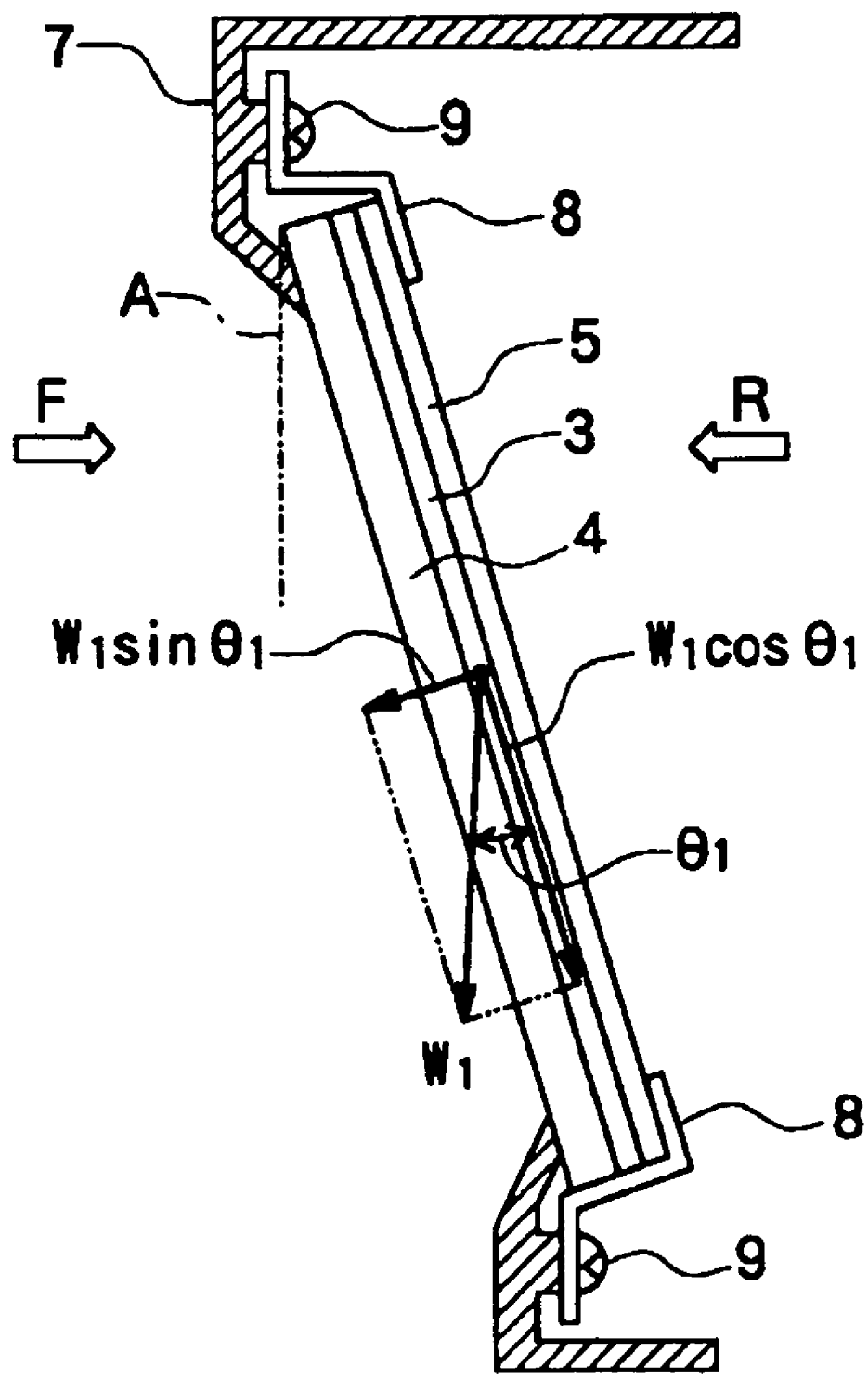
FIG. 3 is a detailed sectional view illustrating the angles at which a screen member and the like are mounted in the device shown in FIG. 1.
Figure 4:
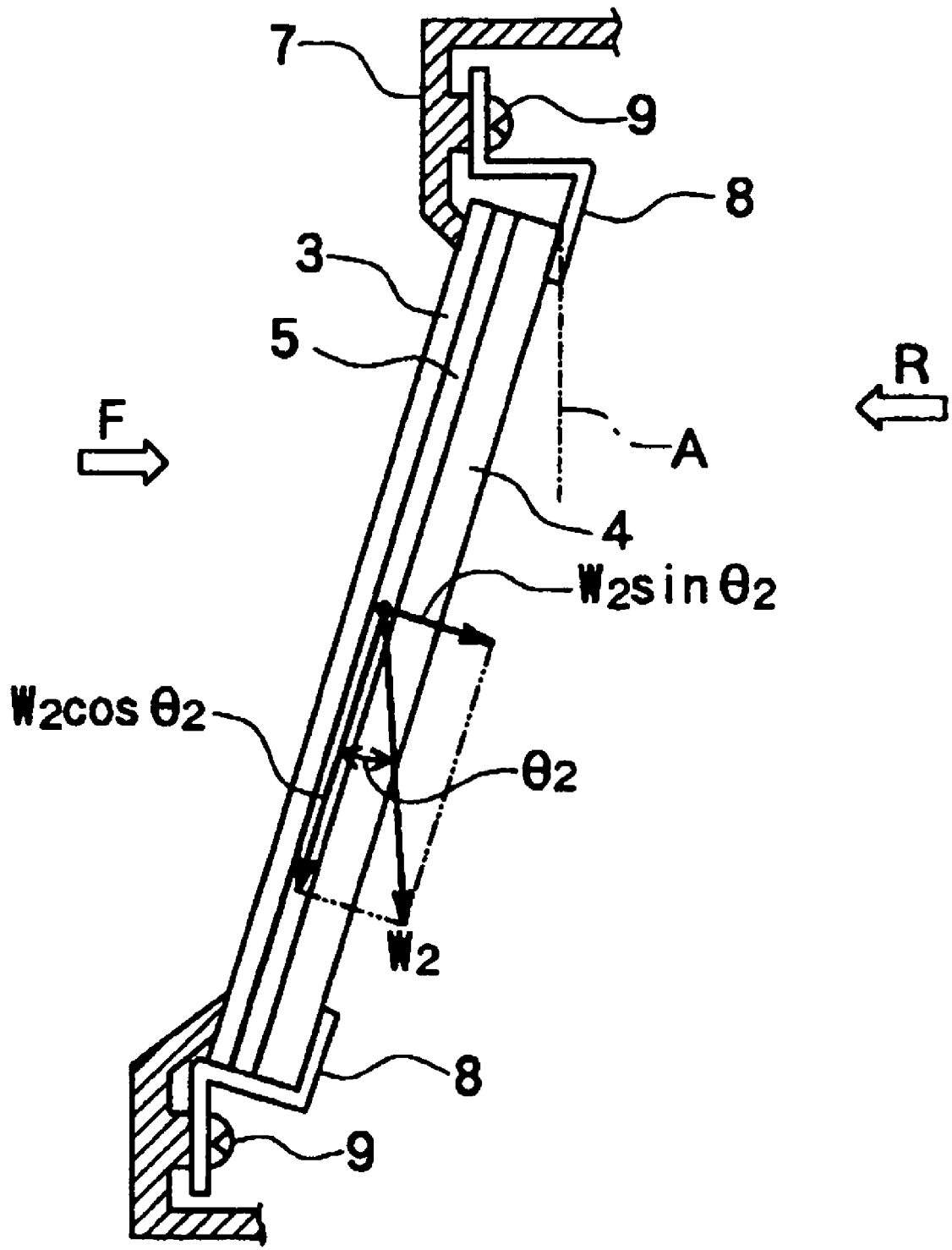
FIG. 4 is a detailed sectional view illustrating the angles at which the screen member and the like are mounted in the device shown in FIG. 2.
Figure 5:
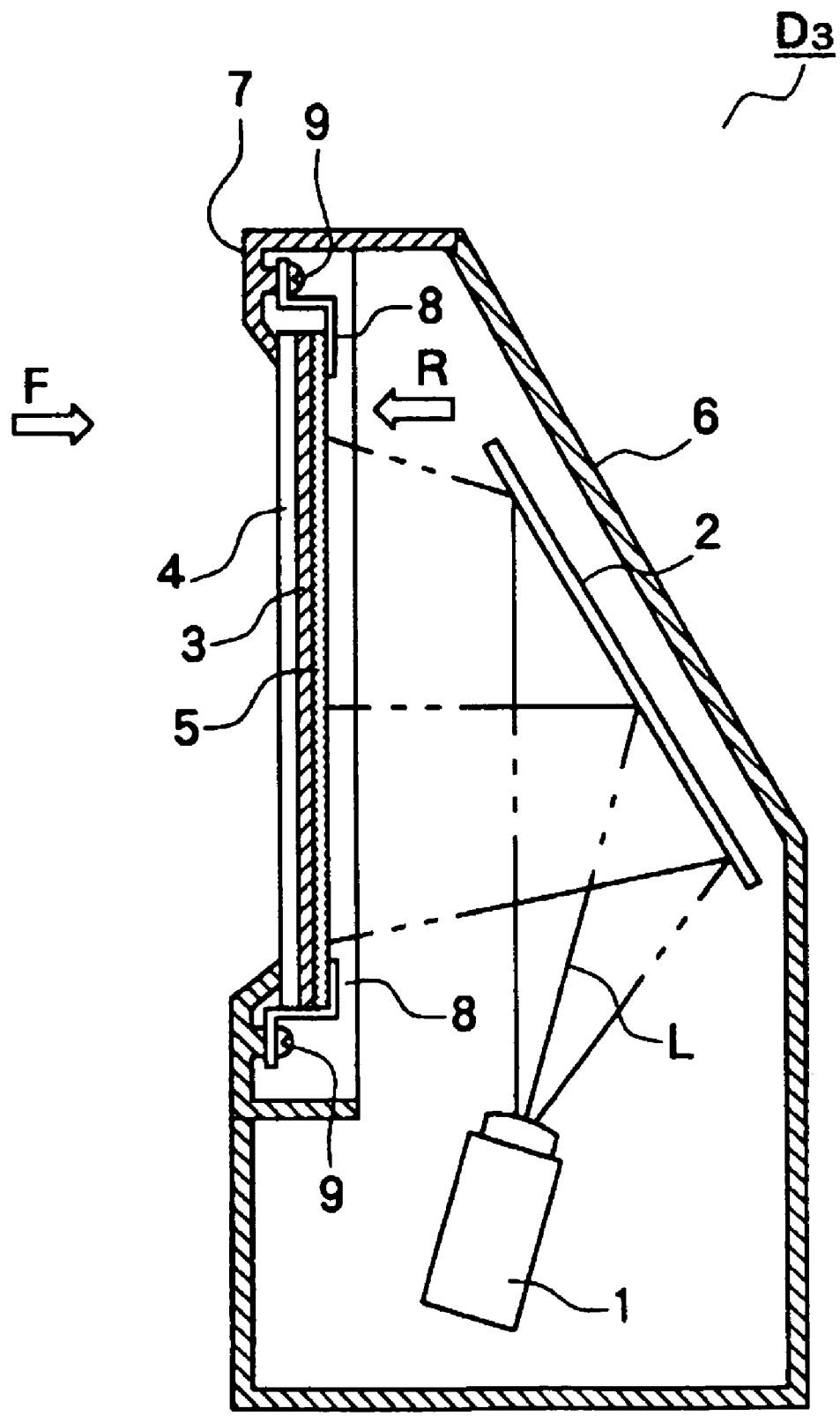
FIG. 5 is a sectional view showing an example of the structure of a rear projection type projector device.
Figure 6:
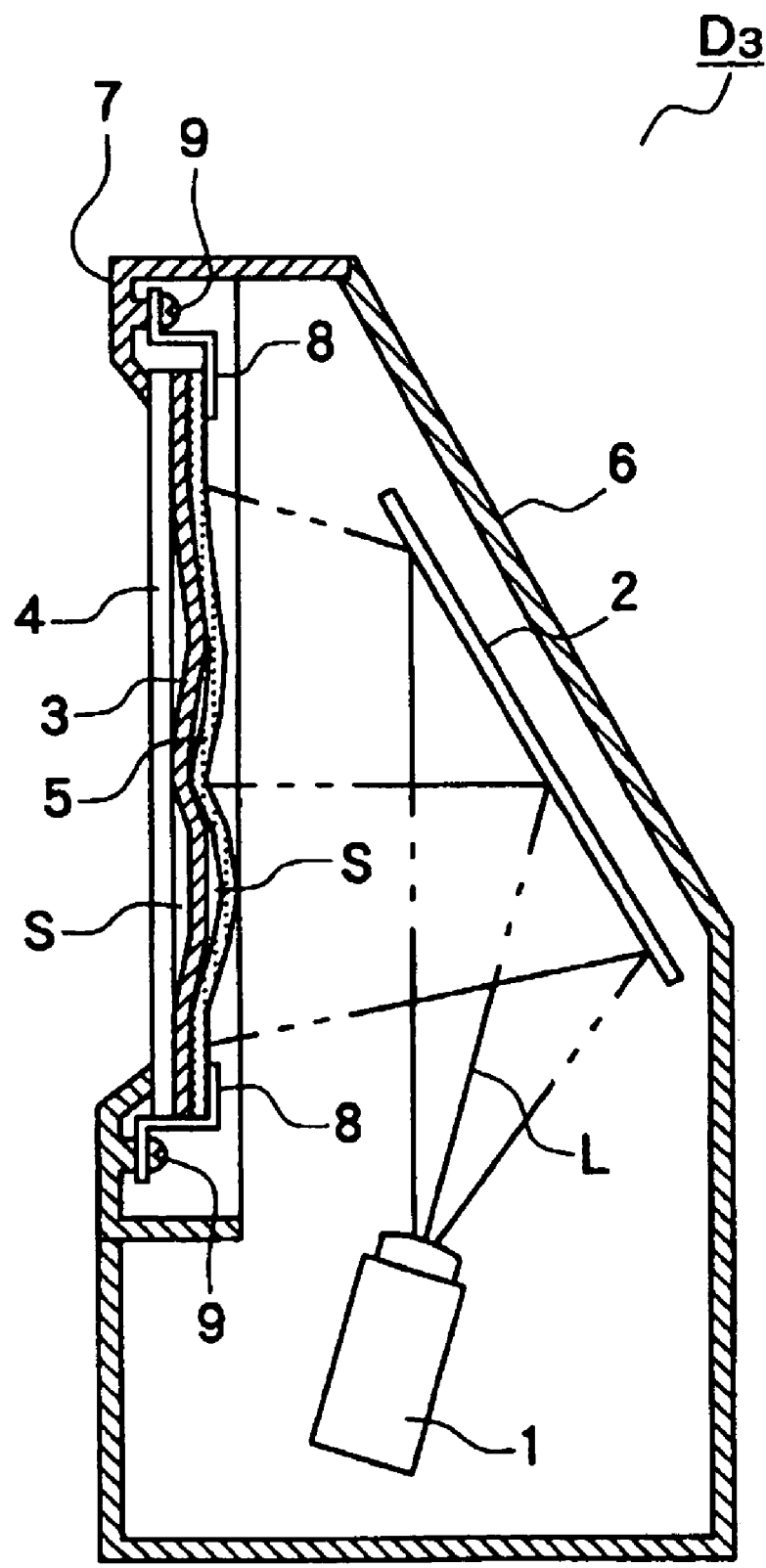
FIG. 6 is a schematic view illustrating problems of a rear projection type projector device.
Figure 7:
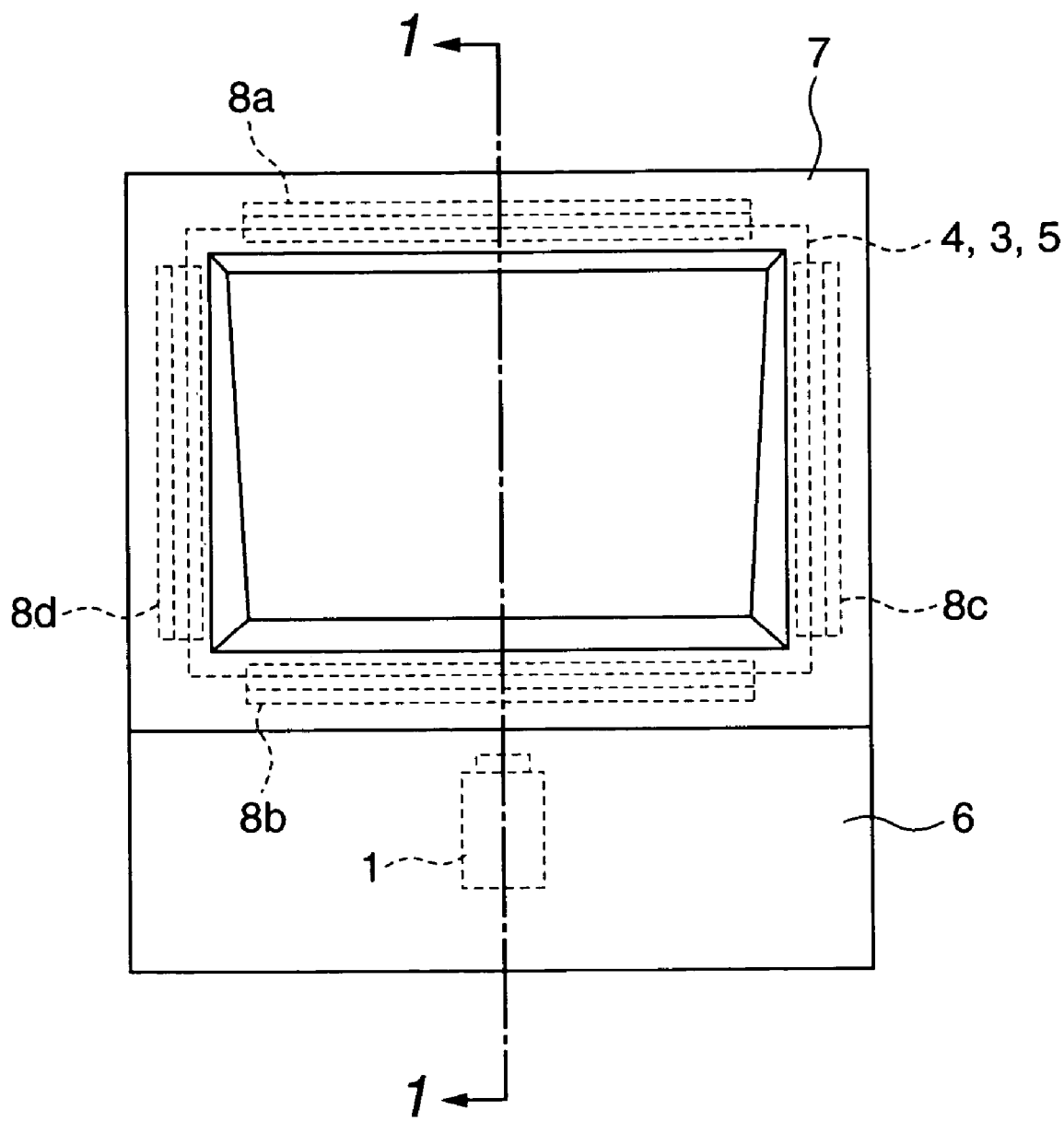
FIG. 7 is a front schematic view of a rear projection type projector device according to the present invention.

FIG. 1 is a sectional view showing an example of the structure of a rear projection type projector device $D_1$ according to the present invention, and showing a sectional view along the line 1—1 of FIG. 7. FIG. 2 is a sectional view showing another example of the structure of a rear projection type projector device $D_2$ according to the present invention. FIG. 3 is a detailed sectional view illustrating the angles at which a screen member and the like are mounted in the device shown in FIG. 1. FIG. 4 is a detailed sectional view illustrating the angles at which the screen member and the like are mounted in the device shown in FIG. 2.

The rear projection type projector device comprises light image output means 1 for outputting a light image L, reflecting means 2 for reflecting the light image L from the light image output means 1, and a screen member 3 on which the light image reflected by the reflecting means 2 is projected. The light image projected from the rear side (shown by arrow R and on which the reflecting means 2 is located) of the screen member 3 is viewed from the front side (shown by arrow F) of the screen member 3. Then, as illustrated in FIG. 3, a transparent member 4 is located along the screen member 3. However, the transparent member 4 is located so as to incline from a vertical plane A. Furthermore, almost all the surface of the screen member 3 is placed on the transparent member 4. Here, the vertical plane means a plane (virtual plane) containing a vertical line (this applies to the description below). The expression "screen member 3 is placed on the transparent member 4" means that the screen member 3 is located on a top surface of the transparent member 4 located so as to incline from the vertical plane A so that the transparent member 4 bears the weight of the screen member 3. The screen member 3 and the transparent member 4 may be in contact with each other or another member (for example, a Fresnel lens 5, described later) may be located between the members 3 and 4. In FIGS. 1 and 3, the transparent member 4 is located on the front side of the screen member 3. However, the present invention is not limited to this aspect. The transparent member 4 may be located on the rear side of the screen member 3 as shown in FIGS. 2 and 4.

In this case, the Fresnel lens 5 may be located on the rear side R of the screen member 3. Almost all the surface of the Fresnel lens 5 may be placed on the transparent member 4 together with the screen member 3. Here, the expression "Fresnel lens 5 is placed on the transparent member 4" means that the Fresnel lens 5 is located on the top surface of the transparent member 4 located so as to incline from the vertical plane A so that the transparent member 4 bears the weight of the Fresnel lens 5. The Fresnel lens 5 and the transparent member 4 may be in contact with each other or another member (for example, the above described screen member 3) may be located between the members 5 and 4.

Furthermore, a housing 6 may be provided to house the light image output means 1 and the reflecting means 2. The screen member 3 and the transparent member 4 (and the Fresnel lens 5) may be supported on the housing 6 at least at their upper ends.

Moreover, the above described light image output means 1 may be composed of a light source that emits light and a light bulb that switches the light from the light source to convert it into a light image.

The transparent member 4 may be rigid. The screen member 3 may be a lenticular screen.

In the present invention, the transparent member is a plate and not a frame.

Furthermore, in the present invention, the screen member is thinner than the transparent member. If the transparent member is, for example, a glass plate having a thickness of 3 to 4 mm, then the screen member has a thickness of larger than 0 mm and at most 1.5 mm.

Furthermore, in the present invention, if the above different member is further installed, it is thinner than the transparent member. If the transparent member is, for example, a glass plate having a thickness of 3 to 4 mm, the Fresnel lens, which is the different member, has a thickness of larger than 0 mm and at most 1.5 mm.

Description will be given of how the transparent member ensures the planarity of the screen member in the present invention.

If the transparent member is installed so as to extend vertically, the screen member is inevitably buckled perpendicularly to the plane of the screen member (either upward from the front surface or downward from the back surface) under the effect of the gravity.

The inclination of the transparent member means that the buckling of the screen member is prevented to allow the screen member to follow the surface of the planar member. The planar member means that it is rigid. In the present embodiment, this rigid member corresponds to the transparent member. More specifically, it corresponds to a glass plate of thickness 3 mm or more. The glass plate uses its plane to prevent the buckling of the screen member.

The screen member is also a plate. Owing to its small thickness, the screen member may be buckled when inclined without any supports. The plate can maintain its planarity provided that it is supported on a plane. Any member that fails to take a planar shape when supported on a plane is assumed to be different from the screen member according to the present invention.

In the present invention, the screen member preferably has an inclination θ of larger than 5.5. This will be described below.

An example will be given in which the screen member is used in a rear projection type projector device having a screen for which the ratio of width to length is 16:9, which is comparable to a 64-inch screen. The screen member is composed of methacrylstyrene resin, which is a typical material. The methacrylstyrene has a specific gravity of 1.18. The screen member weighs 1,560 g when its thickness is 1 mm. When the screen member is stood up so that its long horizontal side corresponds to a bottom side and that it is supported from its screen surface to the degree that it does not fall down, it may be bent (buckled) by 20 to 30 mm. If this bending is avoided by pushing the center of the screen member from the screen surface, a load of about 150 g is required.

If the buckling of the screen member is avoided by utilizing the load of the screen member itself without imposing any external loads on it, then it is possible to determine θ=5.5 on the basis of the relationship 1,560×Sin θ=150. θ denotes the angle between the vertical direction and the inclined screen member. Accordingly, it is understandable that the inclination θ is preferably larger than 5.5 if this angle is utilized to avoid the buckling of the screen member itself to maintain its planarity by using the load of the screen member itself without imposing any external loads on the screen member.

FIG. 7 is a front view of the rear projection type projector device shown in FIG. 1. FIG. 1 is a sectional view taken along line 1—1 in FIG. 7. FIG. 2 is a sectional view showing another example of the structure of a rear projection type projector device. That is, FIGS. 1 and 2 are schematic sectional views of a central portion of the rear projection type projector device. The same reference numerals as those in the previously described drawings denote the same components. Reference numerals 8a, 8b, 8c and 8d denote members used to locate the screen member. These members are arranged on the respective sides of the screen member as shown in the figure. The screen member 3, the transparent member 4, and the Fresnel lens 5 are arranged between the members 8 and the escutcheon 7. In particular, to provide for the possible thermal expansion of at least one of the screen member 3, transparent member 4, and Fresnel lens 5, the members 8 other than the lower member 8b, that is, the members 8a, 8c and 8d, are provided with a clearance in the direction of the thermal expansion (more specifically, at the end of each of the screen member 3, transparent member 4, and Fresnel lens 5). The clearance is about 0.1 to 0.2 mm. The clearance is preferably provided to avoid the offset of the screen member in addition to the thermal expansion.

Figure 8:
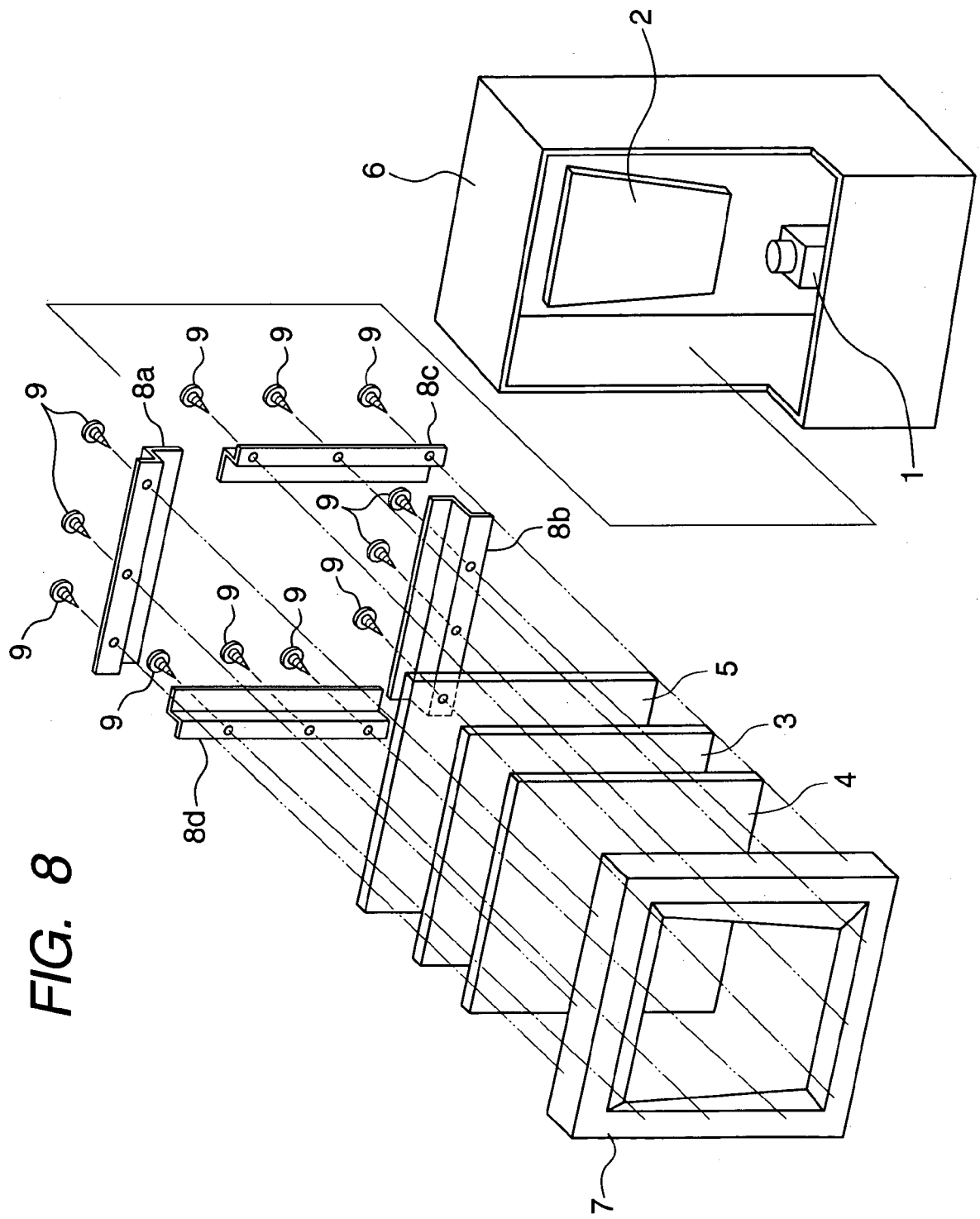
FIG. 8 is a view showing an escutcheon and members of a rear projection type projector device according to the present invention.

The lengths of the members 8a, 8b, 8c and 8d may be individually determined. More specifically, each of the members 8a, 8b, 8c and 8d preferably has a length equal to or larger than two-thirds of one side of the screen member. This does not mean that the plurality of members are considered to be one member having a length equal to or larger than two-thirds of one side of the screen member but that each member has a continuous length equal to or larger than two-thirds of one side of the screen member. Because of the continuity, the load involved in the sandwiching is uniform within one side. Each of the members 8a, 8b, 8c and 8d is fixed to the escutcheon using a screw. FIG. 8 is a view showing the escutcheon and the members arranged as described above.

The effects of the present embodiment will be described below.

According to the present embodiment, the screen member 3 is placed and supported on the transparent member 4. This makes it unlikely to create a space between the screen member 3 and the transparent member 4. It is thus possible to prevent a decrease in resolution and the distortion of an image, thus preventing the degradation of image quality.

Furthermore, the Fresnel lens 5 is located on the rear side R of the screen member 3. When the Fresnel lens 5 is placed on the transparent member 4 together with the screen member 3, it is unlikely to create a space between the Fresnel lens 5 and the screen member 3. It is thus possible to prevent a decrease in resolution and the distortion of an image, thus preventing the degradation of image quality.

The present invention will be described in further detail with reference to examples.

EXAMPLE 1

In the present example, the rear projection type projector device $D_1$, shown in FIGS. 1 and 3, was produced.

In these figures, reference numeral 1 denotes a video source (light image output means) and reference numeral 2 denotes a reflection mirror (reflecting means). Reference numeral 3 denotes a lenticular screen (screen member), and reference numeral 4 denotes a front plate (transparent member). Reference numeral 5 denotes a Fresnel lens. A picture frame-like escutcheon 7 was attached to an opening in a housing 6. The lenticular screen 3, the front panel 4, and the Fresnel lens 5 were attached to the escutcheon 7 using a screw 9 and a presser plate 8. However, the front plate 4 was located so as to incline through an angle $\theta 1$ from a vertical surface A (that is, an upper part of the front plate 4 protrudes toward the front side F). The screen 3 was located on the rear side R of the front plate 4. The Fresnel lens 5 was further placed on the rear side R of the screen 3. Accordingly, the lenticular screen 3 was supported on the front plate 4. However, as shown in FIG. 3, if the weight of the lenticular screen 3 per unit area is defined as w1, the lenticular screen 3 is pressed against the front plate 4 under a force w1 sin $\theta 1$ (in all the portions of the lenticular screen 3). This makes it unlikely to create a space between the lenticular screen 3 and the front plate 4. That is, the weight w1 of the lenticular screen 3 can be divided into a component of force w1 sin $\theta 1$ and a component of force w1 cos $\theta 1$. Here, the component of force w1 sin $\theta 1$ acts in the normal direction of the front plate 4. The component of force w1 cos $\theta 1$ acts in the plane direction of the front plate 4. The component of force w1 sin $\theta 1$ operates as a force that presses the lenticular screen 3 itself against the front plate 4. The lenticular screen 3, which is thin and not rigid, is in tight contact with the front plate 4, which is very rigid, so as to rest against and adhere to the front plate 4. This also applies to the Fresnel lens 5. The Fresnel lens 5 is in tight contact with the front plate 4 via the lenticular screen 3 so as to rest against and adhere to the front plate 4.

EXAMPLE 2

In the present example, the rear projection type projector device $D_2$, shown in FIGS. 2 and 4, was produced. The front plate 4 was located so as to incline through an angle $\theta 2$ from a vertical surface A (that is, a lower part of the front plate 4 protrudes toward the front side F). The Fresnel lens 5 was placed on the front side F of the front plate 4. The lenticular screen 3 was further placed on the front side F of the Fresnel lens 5. Accordingly, the Fresnel lens 5 was supported on the front plate 4. However, as shown in FIG. 4, if the weight of the Fresnel lens 5 per unit area is defined as w2, the Fresnel lens 5 is pressed against the front plate 4 under a force w2 sin $\theta 2$ (in all the portions of the Fresnel lens 5). This makes it unlikely to create a space between the Fresnel lens 5 and the front plate 4. That is, the weight w2 of the Fresnel lens 5 can be divided into a component of force w2 sin $\theta 2$ and a component of force w2 cos $\theta 2$. Here, the component of force w2 sin $\theta 2$ acts in the normal direction of the front plate 4. The component of force w2 cos $\theta 2$ acts in the plane direction of the front plate 4. The component of force w2 sin $\theta 2$ operates as a force that presses the Fresnel lent 5 itself against the front plate 4. The Fresnel lens 5, which is thin and not rigid, is in tight contact with the front plate 4, which is very rigid, so as to rest against and adhere to the front plate 4. This also applies to the screen 3. The screen 3 is in tight contact with the front plate 4 via the Fresnel lens 5 so as to rest against and adhere to the front plate 4.

As described above in the embodiment and examples, according to the present invention, the screen member is placed and supported on the transparent member. This makes it unlikely to create a space between the screen member and the transparent member. It is thus possible to prevent a decrease in resolution and the distortion of an image, thus preventing the degradation of image quality.

What is claimed is:

1. A rear projector comprising:
   light image output means for outputting a light image;
   a reflector which reflects the light image from the light image output means;
   a lenticular screen;
   a Fresnel lens; and
   a transparent member supported so as to incline from a vertical plane,
   wherein at least one member of the lenticular screen and the Fresnel lens is inclined so as to follow a planar surface of the transparent member by the load of the at least one member itself.

2. A rear projector according to claim 1, wherein the lenticular screen is supported between the Fresnel lens and the transparent member.

3. A rear projector according to claim 2, wherein the transparent member is inclined so as to lean forward with respect to a user.

4. A rear projector comprising:
   light image output means for outputting a light image;
   a reflector which reflects the light image from the light image output means;
   a lenticular screen;
   a Fresnel lens; and
   a transparent member supported so as to incline from a vertical plane,
   wherein both the lenticular screen and the Fresnel lens are located on the transparent member and are thinner than the transparent member.

5. A rear projector according to claim 4, wherein the Fresnel lens is supported between the lenticular lens and the transparent member.

6. A projector according to claim 5, wherein the transparent member is supported so as to lean backward with respect to a user.

* * * * *